(12) United States Patent
Lee et al.

(10) Patent No.: US 12,093,570 B2
(45) Date of Patent: Sep. 17, 2024

(54) METHOD AND SYSTEM FOR MAXIMIZING PERFORMANCE OF A STORAGE SYSTEM

(71) Applicant: EMC IP Holding Company LLC, Hopkinton, MA (US)

(72) Inventors: Shuyu Lee, Acton, MA (US); Vamsi K. Vankamamidi, Hopkinton, MA (US); Jeffrey L. Grummon, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 98 days.

(21) Appl. No.: 17/877,638

(22) Filed: Jul. 29, 2022

(65) Prior Publication Data
US 2022/0365728 A1 Nov. 17, 2022

Related U.S. Application Data

(63) Continuation of application No. 17/161,979, filed on Jan. 29, 2021, now Pat. No. 11,435,954.

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
None
See application file for complete search history.

(56) References Cited

U.S. PATENT DOCUMENTS

2015/0278243 A1* 10/2015 Vincent ................. G06F 16/182
707/634

* cited by examiner

*Primary Examiner* — Scott C Sun
(74) *Attorney, Agent, or Firm* — Krishnendu Gupta; Deepika Bhayana; Lesley A. Leonessa

(57) ABSTRACT

In a method used for maximizing performance of a storage system, saturation points of the storage system for I/O requests of different types and sizes are identified. Normalized tokens are determined based on the saturation points. Unique numbers of normalized tokens are associated with the I/O requests of different types and sizes. A number of normalized tokens for a queue depth limit of a storage device is determined. From the queue depth limit, normalized tokens are allocated to each node in the storage device. I/O requests are processed according to the allocations of normalized tokens.

18 Claims, 9 Drawing Sheets

METHOD AND SYSTEM FOR MAXIMIZING PERFORMANCE OF A STORAGE SYSTEM

CROSS REFERENCE TO RELATED APPLICATIONS

This Application is related to co-pending U.S. patent application Ser. No. 17/161,979 entitled "METHOD AND SYSTEM FOR MAXIMIZING PERFORMANCE OF A STORAGE SYSTEM" filed on Jan. 29, 2021, the teachings of which applications are hereby incorporated herein by reference in their entirety.

BACKGROUND

Technical Field

This application relates to maximizing performance of a storage system.

Description of Related Art

Computer systems may include different resources used by one or more host processors. Resources and host processors in a computer system may be interconnected by one or more communication connections. These resources may include, for example, data storage devices. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of drives (disk drives are also referred to herein as simply "disks" or "drives"). In general, the processing circuitry performs load and store operations on the set of drives on behalf of the host devices. In certain data storage systems, the drives of the data storage system are distributed among one or more separate drive enclosures (disk drive enclosures are also referred to herein as "disk arrays" or "storage arrays") and processing circuitry serves as a front-end to the drive enclosures. The processing circuitry presents the drive enclosures to the host device as a single, logical storage location and allows the host device to access the drives such that the individual drives and drive enclosures are transparent to the host device.

SUMMARY OF THE INVENTION

One aspect of the current technique is a method for maximizing performance of a storage system. The method includes identifying saturation points of the storage system for I/O requests of different types and sizes; determining, based on the saturation points, normalized tokens; associating unique numbers of normalized tokens with the I/O requests of different types and sizes; determining a number of normalized tokens for a queue depth limit of a storage device; allocating, from the queue depth limit, normalized tokens to each node in the storage device; and processing I/O requests according to the allocations of normalized tokens.

In some embodiments, the method includes identifying the saturation points for each type of storage device in the storage system. The method may include comparing the saturation point of a read request of the smallest size against the remaining saturation points. Normalized tokens may be allocated to each group of storage processors in each node When a load of the storage system has exceeded a first threshold, I/O requests may be processed according to a system of prioritization. For example, high, medium, and low priority I/O requests may be serviced according to a predetermined ratio. The ratio may concern a predetermined ratio of requests or a predetermined ratio of available normalized tokens. In some embodiments, when the load of the storage system has exceeded a second threshold, solely I/O requests associated with a high priority may be processed.

In some embodiments, the normalized tokens are updated based on newly identified saturation points of the storage system for I/O requests of different types and sizes. The updating may occur in response to a determination regarding latency of the storage system, or a predetermined schedule for storage system re-evaluation.

Another aspect of the current technique is a system, with a processor, for maximizing its performance. The processor is configured to identify saturation points of the storage system for I/O requests of different types and sizes; determine, based on the saturation points, normalized tokens; associate unique numbers of normalized tokens with the I/O requests of different types and sizes; determine a number of normalized tokens for a queue depth limit of a storage device; allocate, from the queue depth limit, normalized tokens to each node in the storage device; and process I/O requests according to the allocations of normalized tokens. The processor may be configured to perform any other processes in conformance with the aspect of the current technique described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF
EMBODIMENT(S)

Described below is a technique for maximizing performance of a storage system, which technique may be used to provide, among other things, identifying saturation points of the storage system for I/O requests of different types and sizes; determining, based on the saturation points, normalized tokens; associating unique numbers of normalized tokens with the I/O requests of different types and sizes; determining a number of normalized tokens for a queue depth limit of a storage device; allocating, from the queue depth limit, normalized tokens to each node in the storage device; and processing I/O requests according to the allocations of normalized tokens Given the finite computing resources of storage devices in a data storage system, the devices can accept a limited number of I/O requests at a time. The limits of a device, referred to herein as the "queue depth limit", is conventionally measured in terms of input/output (I/O) operations. For example, one storage device may have the capacity to accept five hundred and twelve (512) I/O requests at a time. Once this capacity is reached, the storage device does not accept further requests, but may resume queueing incoming requests as the pending requests are processed. Because the data storage system may include multiple nodes that access the storage devices to service hosts, the queue depth limit may be distributed among the nodes. For example, in a data storage system with two nodes, with respect to a storage device with a queue depth limit of 512 I/O requests, both nodes may be allocated capacity for 256 requests. Such parameters are conventionally coded into the data storage system by design.

However, because read and write requests exhibit different latencies, evenly distributing the queue depth limit does not result in a balanced load across the nodes, or the storage processors within a node. As a result, storage devices may be under-utilized as other requests for other devices are processed. Furthermore, because queue depth limit is measured by number of I/O transactions and encoded into the data storage system, the storage system cannot adjust its approach to processing I/O requests based on its load. Additionally, encoded parameters cannot account for prospective changes to the data storage system's performance, as the system ages.

In at least some implementations in accordance with the systems and methods of improving storage system performance as described herein, the use of the solutions can provide one or more of the following advantages: increased utilization of the storage devices via more effective load balancing of I/O requests, improved performance from the perspective of host devices, optimization of performance as the data storage system ages.

Figure 1:
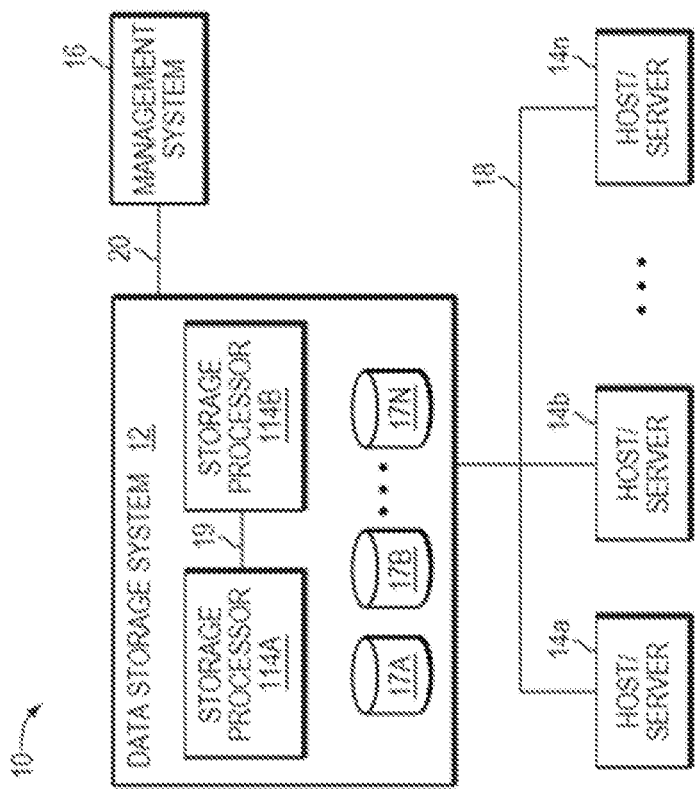
FIG. 1 depicts an exemplary embodiment of a computer system that may utilize the techniques described herein.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B (collectively, "114") or computer processing units. Techniques herein may be more generally used in connection with any one or more data storage system 12 each including a different number of storage processors 114 than as illustrated herein. The data storage system 12 may include a data storage array, including a plurality of data storage devices 17a-17n and the storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, other embodiments of the data storage system 12 may include multiple storage processors 114, having more than the two storage processors as described in the embodiment depicted in FIG. 1. Additionally, the storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

The storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the storage processors 114A, 114B. Upon the occurrence of failure of one the storage processors 114A, 114B, the other remaining storage processors 114A, 114B may handle all processing typically performed by both storage processors 114.

Figure 2:
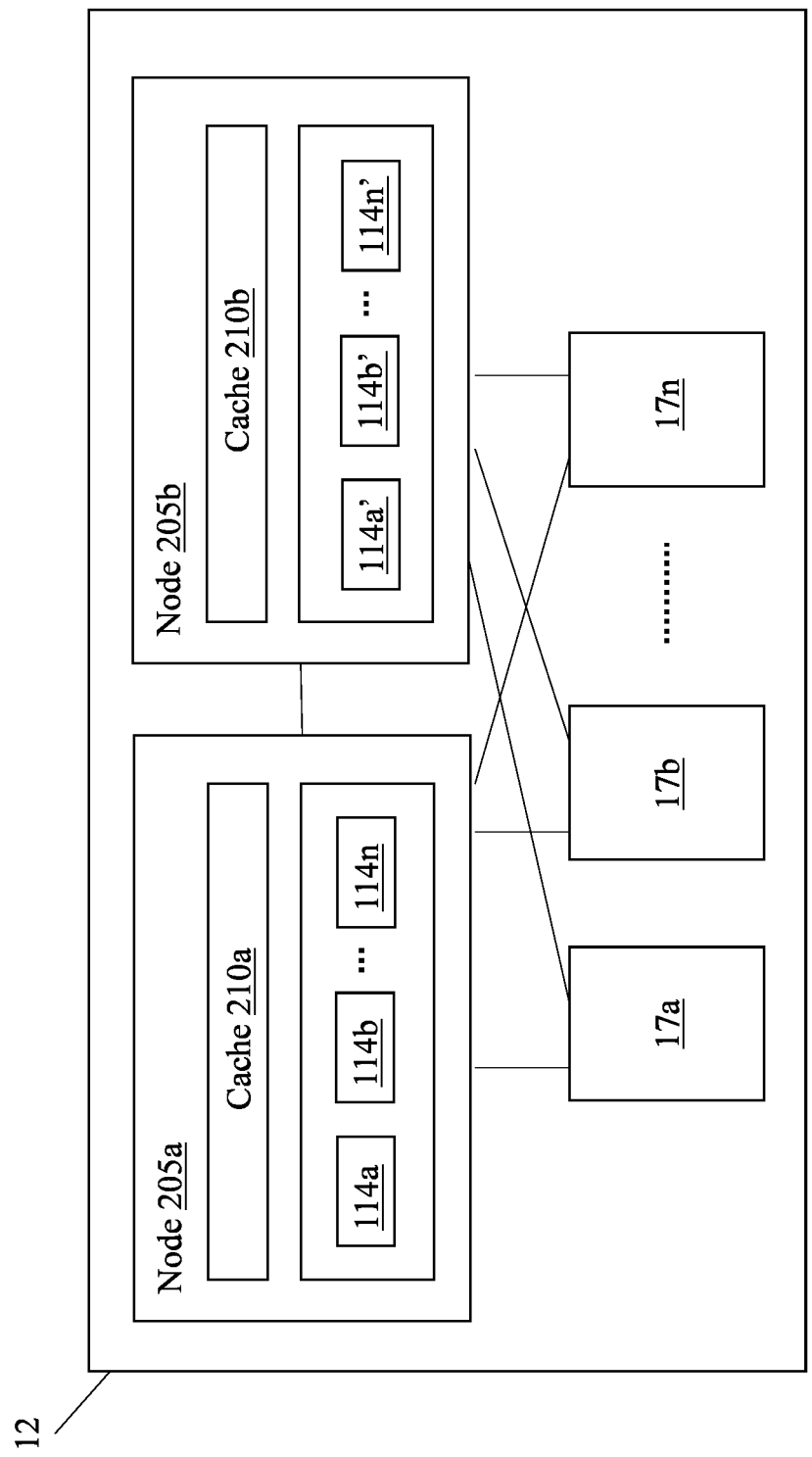
FIG. 2 depicts an exemplary embodiment of the data storage system used in the computer system of FIG. 1.

FIG. 2 depicts an exemplary embodiment of a data storage system 12 used in the computer system 10 of FIG. 1. This embodiment illustrates a configuration that achieves high availability for the data storage devices 17a-17n. The data storage system 12 includes two nodes 205a, 205b (collectively, "205"), each of which can service requests from hosts 14a-14n, among other components. Each node 205 can access any of the data storage devices 17a-17n of the data storage system 12. If one node 205a fails, the other node 205b can continue processing requests, thereby ensuring that the data storage system 12 remains available. When both nodes 205 are operational, their collective computing resources reduce the latency for incoming requests.

Each node 205a, 205b includes a cache 210a, 210b for storing data retrieved from the storage devices 17a-17n. In many embodiments, the nodes 205 coordinate to ensure that the caches 210a, 210b have the same data. Each node 205a also includes a set of storage processors 114. In various embodiments, the storage processors 114 may be organized into two or more groups 215a, 215b (one exemplary embodiment is illustrated by the node 205*a*' in FIG. 3). Each group 215 of storage processors 114 operates together to process requests. For example, a node 205 may be configured to accept two hardware components, each of which includes a group 215 of storage processors 114. The group 215 of storage processors 114 on a single hardware component may operate together to service requests, and in some embodiments, this entity may be referred to as a "socket". In this manner, a node 205 may have two sockets, each of which includes a group 215 of storage processors 114 that operate together to process at least part of the load of the node 205. Together, the storage processors 114 across all of sockets service the requests of the node 205.

Various embodiments of the data storage system 12 described herein express the queue depth limit in tokens, instead of I/O operations. Each token is a relative measure of computing resources available for conducting I/O operations. The storage system 12 allocates tokens to each node 205, and in turn, each node 205 may allocate tokens among their groups 215 of storage processors 114. When a node 205 receives an I/O request from a host 14, the node 205 determines the number of tokens corresponding to the type of request (e.g., read, write) and the size of data (e.g., 4 KB, 8 KB, 16 KB). The node 205 issues the I/O request to a storage device 17, and deducts the corresponding number of tokens from its allocation. The node 205 maintains the I/O requests that it issues within its allocation of tokens.

The amount of computing resources required by an I/O request depends not only on the type of operation (e.g., read, write), but also on the amount of data involved (e.g., 4 KB, 8 KB, 16 KB, 64 KB). The performance of the data storage system 12 with respect to any given operation (e.g., read of 4 KB, read of 8 KB, write of 4 KB, write of 8 KB) may fluctuate based on the operating conditions of the data storage system 12. Thus, the operating conditions of the data storage system 12 must be assessed in real-time to evaluate accurately the computing resources that each type of operation requires, relative to one another.

To begin this evaluation, the data storage system 12 models its performance for different types of I/O requests to identify associated saturation points. The saturation point corresponds to the number of I/O requests the data storage system 12 can accommodate, after which the throughput of the storage system 12 no longer appreciably improves. In these situations, because the storage system 12 cannot absorb additional I/O requests effectively, latency increases unacceptably (e.g., linearly).

Figure 4:
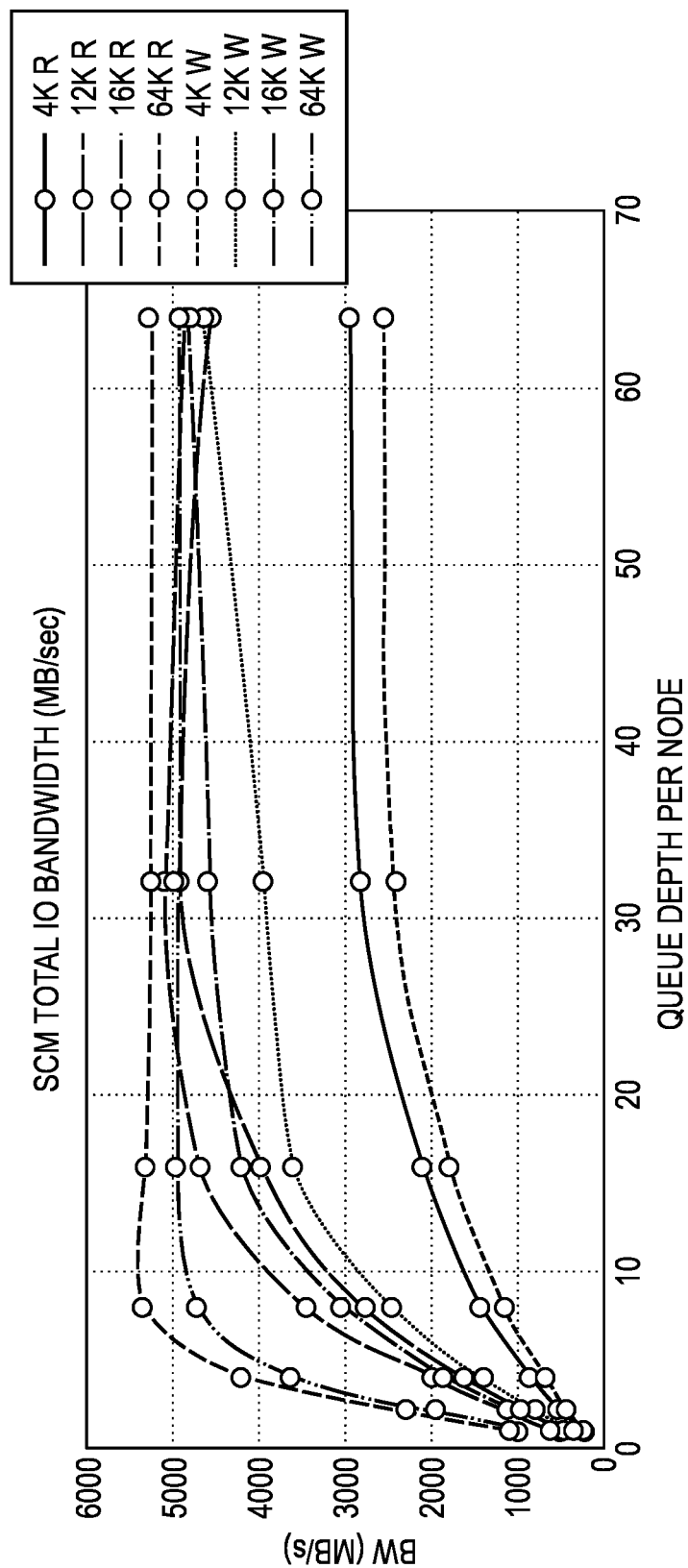
FIGS. 4-6 are exemplary graphs modeling the behavior of storage devices for I/O requests of different types and sizes.

FIG. 4 is a graph displaying the throughput of the data storage system 12 for different types of I/O requests, as a function of load, for one type of storage (e.g., storage class memory). In this example, for read requests of 4 KB, the storage system 12 exhibits throughput of about 800 MB/s when the load for a node 205 is four (4) requests. Throughput rises to about 1100 MB/s when the load is eight (8) requests, as the storage system 12 still has excess capacity to process the I/O requests. For loads of sixteen (16) and thirty-two (32) requests, throughput rises to about 1900 MB/s and 2400 MB/s, respectively. However, for a load of sixty-four (64) requests, throughput rises to only about 2500 MB/s—not appreciably more than that for half as many requests. Thus, in this example, the saturation point for read requests of 4 KB would be a load of thirty-two (32) requests, as throughput no longer improves significantly thereafter, but latency begins to rise unacceptably.

In this same example, for read requests of 64 KB, throughput rises to about 4200 MB/s for a load of four (4) requests, and then to about 5300 MB/s for a load of eight (8) requests. However, throughput drops when the load is increased to sixteen (16) requests. Thus, for read requests of 64 KB, the saturation point is eight (8) requests. Thus, under these operating conditions of the data storage system 12, eight read requests of 64 KB would saturate the storage devices 17*a*-17*n* as much as thirty-two read requests of 4 KB. Consequently, a normalized token system must recognize that a read request of 64 KB consumes four times as many computing resources as a read request of 4 KB.

Also in this example, for write requests of 64 KB, throughput rises to about 3700 MB/s for a queue depth of four (4) requests, and then to about 4800 MB/s for a queue depth of eight (8) requests. When the queue depth is increased to sixteen (16) requests, throughput increases to about 5000 MB/s, but this increase is not appreciable compared to the increase in write requests. Thus, for write requests of 64 KB, the saturation point is eight (8) requests, which saturate the storage devices 17*a*-17*m* as much as thirty-two read requests of 4 KB. As with read requests of 64 KB, the normalized token system must recognize the relative resource consumption of 64 KB write requests, compared to other types of I/O operations.

In this manner, the data storage system 12 would identify the saturation points for read requests of different sizes (e.g., 4 KB, 12 KB, 16 KB, 64 KB), as well as write requests of the same size. Since read requests of 4 KB require the fewest computing resources to process, the saturation points for other types of requests would be compared against that for read requests of 4 KB to determine a normalized system for tokens. Referring to the examples above, a read request of 4 KB would be assigned a single token. Because read and write requests of 64 KB consume four times as many computing resources, they would each be assigned four (4) tokens. The data storage system 12 would repeat the comparisons for every type of I/O operation to derive normalized token assignments.

Figure 3:
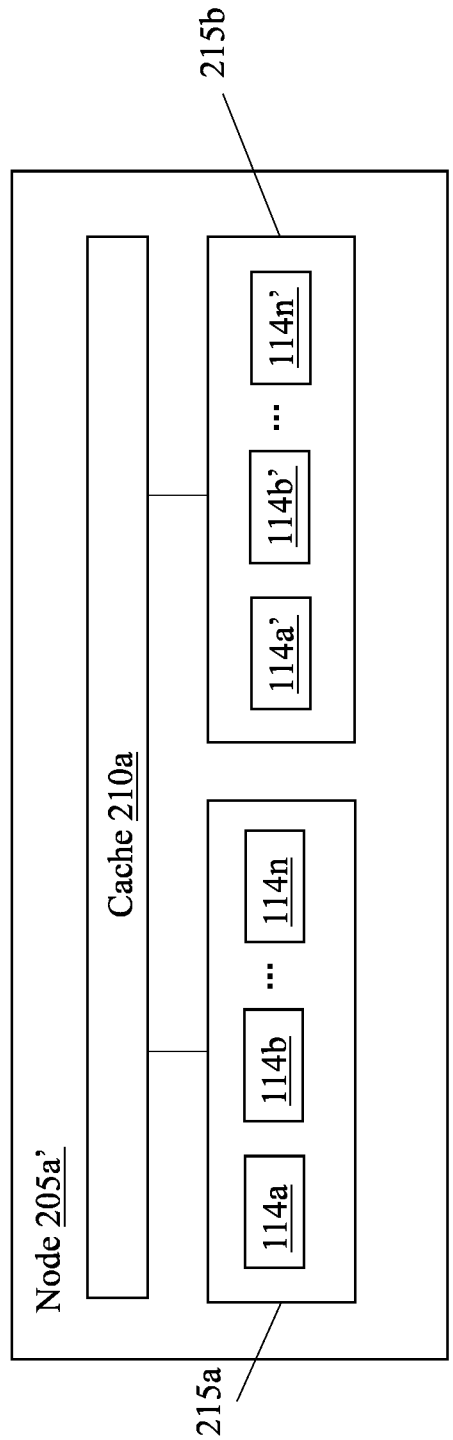
FIG. 3 depicts another exemplary embodiment of a node that may be used in the data storage system of FIG. 2.
Figure 5:
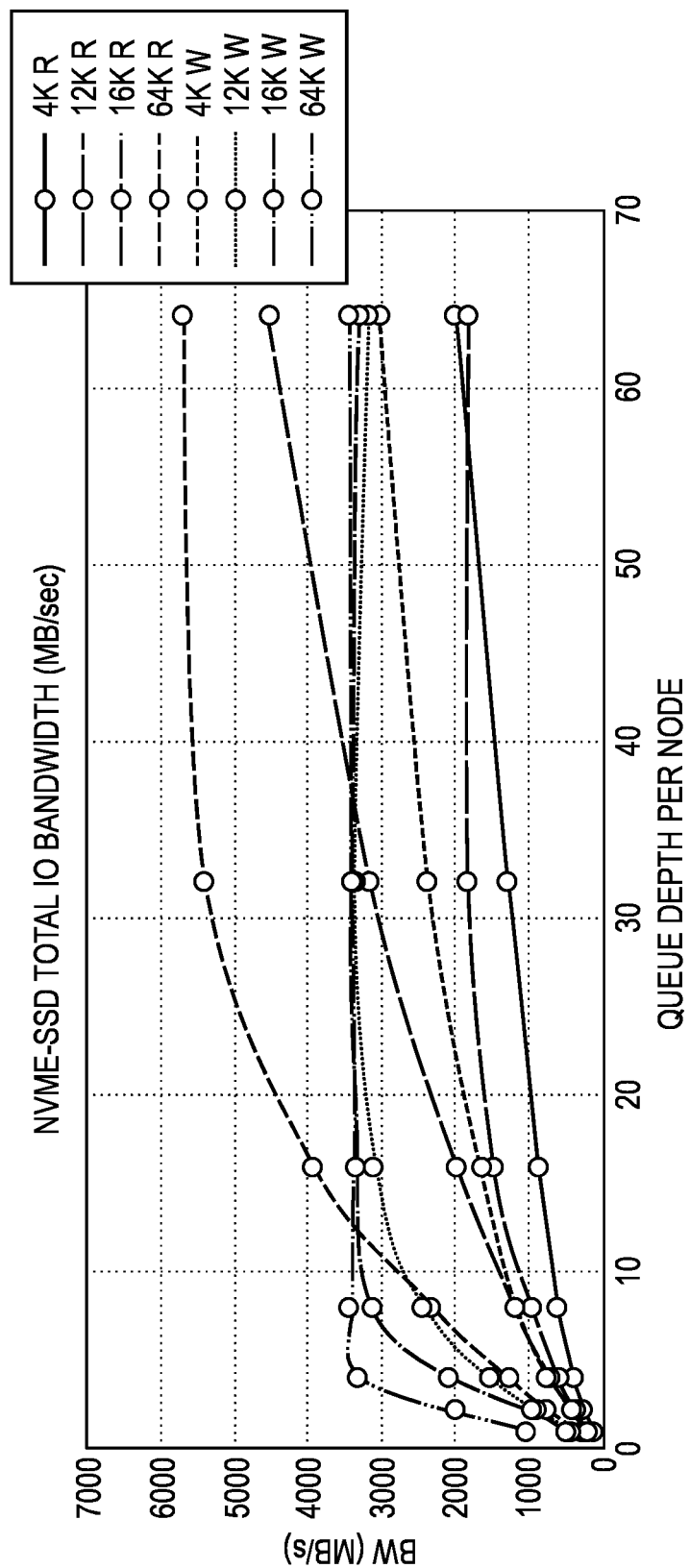
Figure 6:
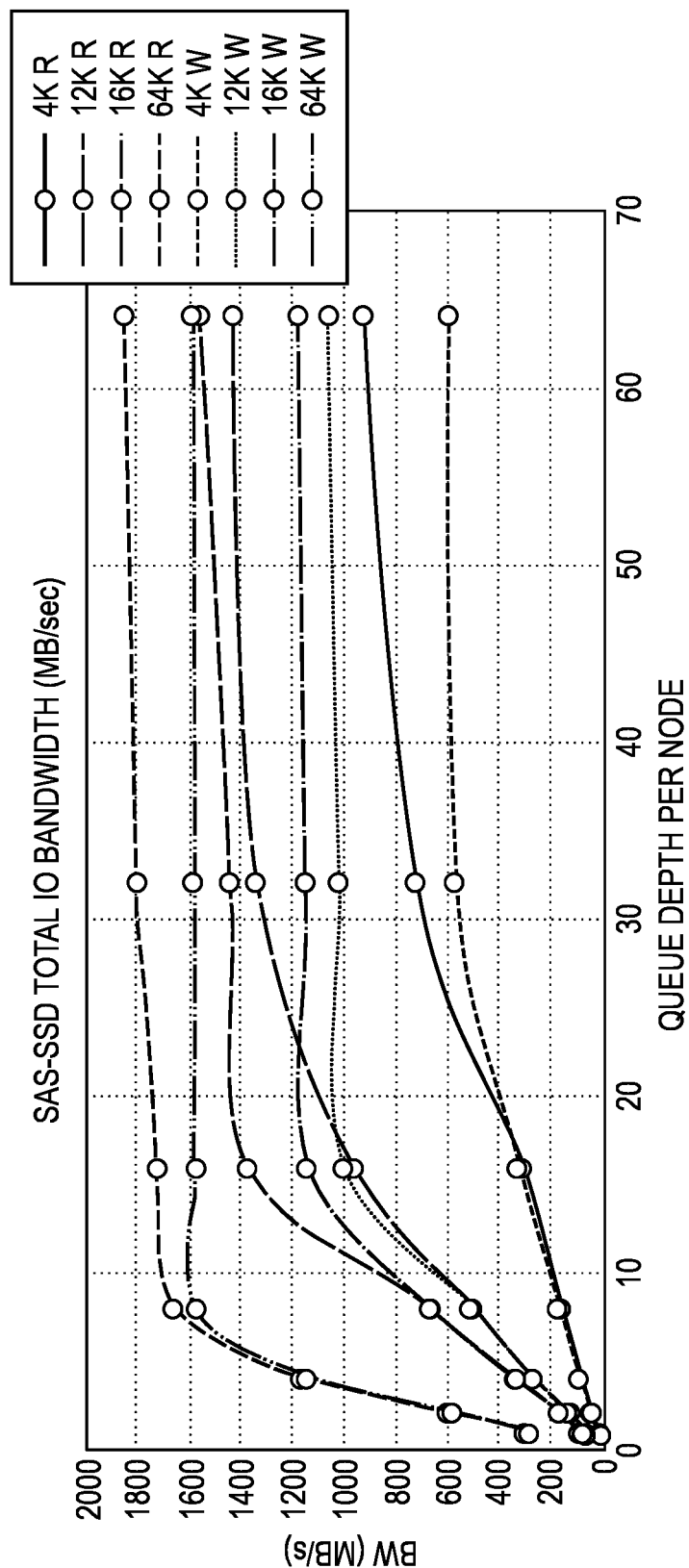

Furthermore, in many embodiments, the data storage system 12 normalizes I/O operations for different types of storage devices 17*a*-17*n*. FIG. 3 depicts saturation models for one type of storage (e.g., storage class memory), but the storage devices 17*a*-17*n* may encompass other types of storage. FIGS. 4 and 5 depict saturation models for NVMe (Non-Volatile Memory Express) solid state devices and serial-attached SCSI (SAS) solid state devices, respectively. The data storage system 12 may use saturation points of all types of storage to determine normalized tokens to assign to each type of I/O request. The tokens for each type of storage device 17*a*-17*n* may then be distributed among the storage processors 114.

In addition to limiting I/O requests based on its allocation of tokens, a node 205 may also determine which I/O requests to issue, based on the load of the data storage system 12. The data storage system 12 fields I/O requests for various purposes, so that some I/O requests may be prioritized over others. The highest priority is reading data from a storage device 17, as the storage system 12 is responding to a request from a host 14. When a node 205 receives a read request and determines that the data is not stored in its cache 210 (also known as a "cache miss"), the node 205 issues a read request to a storage device.

The next priority I/O requests (e.g., medium priority) pertain to cache flushes. When a node 205 receives a write request, the new data is stored in the cache 210. In some embodiments, one node 205*a* shares the new data with the other node 205*b*; by storing this new data in both caches 210*a*, 210*b*, each node 205 maintains the most current version and avoids reading outdated data from the storage device 17. Because the caches 210a, 210b have limited capacity, the nodes 205 flush data from write requests to the storage devices 17a-17n. In some embodiments, the nodes 205 may flush the caches 210a, 210b when the caches 210a, 210b reach their capacity. In other embodiments, the nodes 205 may flush the caches 210a, 210b on a predetermined schedule.

The lowest priority I/O requests pertains to background processes. For example, the data storage system 12 may conduct garbage collection to maintain its storage devices 17a-17n, as well as other processes as would be appreciated by one of ordinary skill in the art.

In many embodiments, the data storage system 12 uses its load to determine whether I/O requests need to be prioritized. Prioritization may be initiated when the storage system's 12 load reaches a threshold with respect to its queue depth limit. For example, suppose the queue depth limit is 4096 tokens, and the threshold is 80% (i.e., 3276 tokens). When the I/O requests across the nodes 205 correspond to 3276 tokens or fewer, the storage system 12 may process all I/O requests in a first in, first out (FIFO) order, regardless of their origin or purpose.

However, when the load exceeds the threshold, the storage system 12 may prioritize among the three types of I/O requests. In some embodiments, the storage system 12 may service the differently prioritized I/O requests according to a ratio. For example, eight (8) high priority requests may be processed, followed by four (4) medium priority ones, and then two (2) low priority requests, in one such cycle. In other embodiments, the storage system 12 dedicates different percentages of the available tokens to the types of requests. For example, subsequent I/O requests may be processed such that high priority requests occupy 70% of the tokens, medium priority requests occupy 20%, and low priority requests occupy 10%. In any of these examples, other percentages may be used, as would be appreciated by one of ordinary skill in the art.

Additionally, when the data storage system 12 becomes overloaded, only high priority requests will be serviced. In some embodiments, this state is recognized when the load surpasses a second, higher threshold of the queue depth limit, such as 95%. In such a state, only read requests associated with cache misses may be processed until the load drops to the first, lower threshold (e.g., 80%). Then, the storage system 12 reverts to processing all types of requests, according to the prioritizing approach discussed herein.

Furthermore, as the data storage system 12 ages, the operating conditions of the data storage system 12 may change. The physical components of storage devices 17a-17n themselves may degrade with wear, and the storage itself may become more fragmented or inefficient. Given the shifting operating conditions, the relative amount of computing resources consumed by the different types of I/O requests may change. Further, in light of its suboptimal state, the data storage system 12 may begin exhibiting greater latencies at lower loads.

The data storage system 12 may update its models of performance. In re-running its models, the storage system 12 may re-calibrate the normalized tokens to assign to the different types of I/O requests. Furthermore, the storage system 12 may update the queue depth limits for each type of storage device 17a-17n, and allocate the tokens associated with these updated limits to the storage processors 114. In turn, the thresholds at which the storage devices 17a-17n begin prioritizing I/O requests are adjusted. As a result, the storage devices 17a-17n prioritize I/O requests when the load reaches thresholds with respect to the storage system's 12 saturation point, given its current operating conditions. In this manner, the data storage system 12 avoids continuing first in, first out (FIFO) processing when its load warrants prioritization.

Figure 7A:
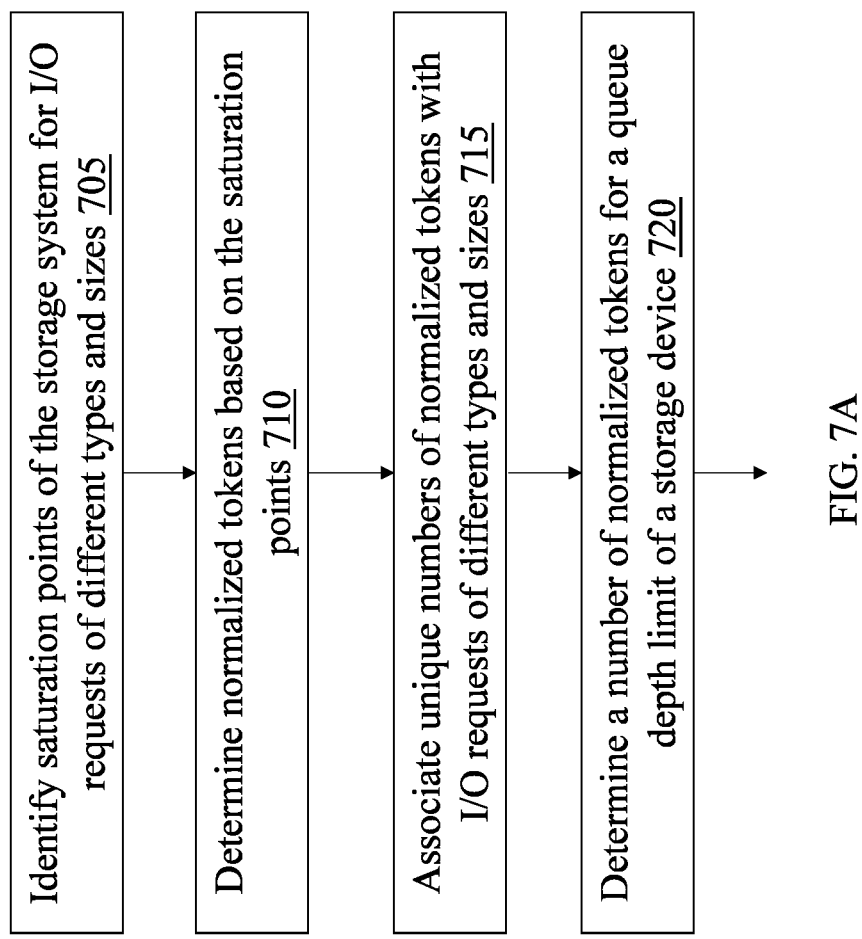
FIGS. 7A-7C are exemplary flow diagrams of methods for maximizing performance of a storage system.
Figure 7B:
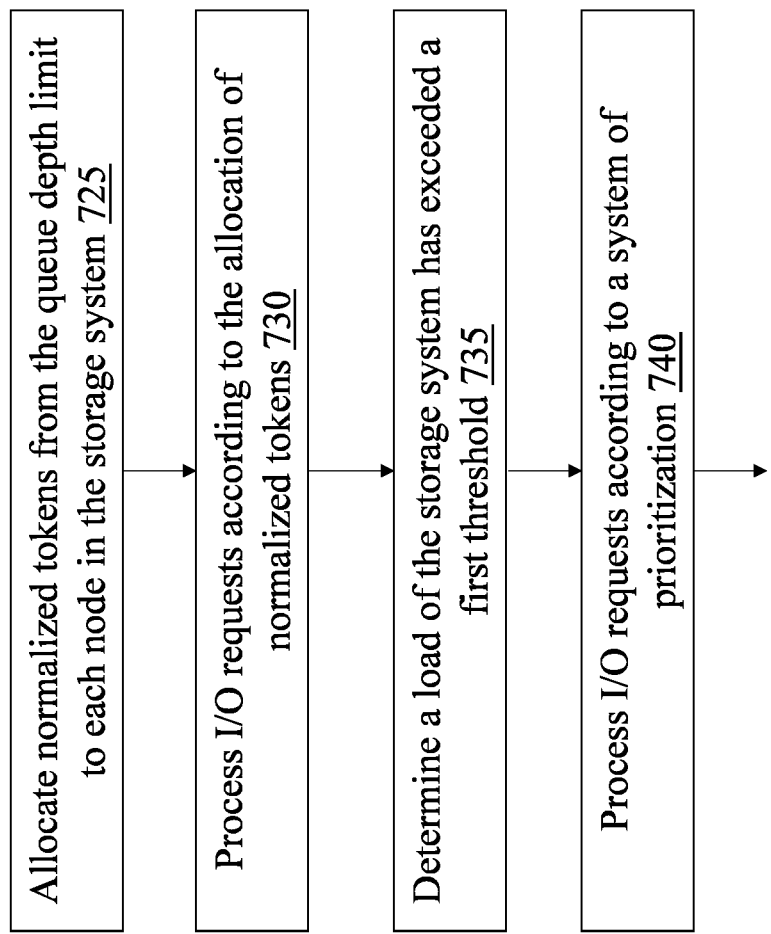
Figure 7C:
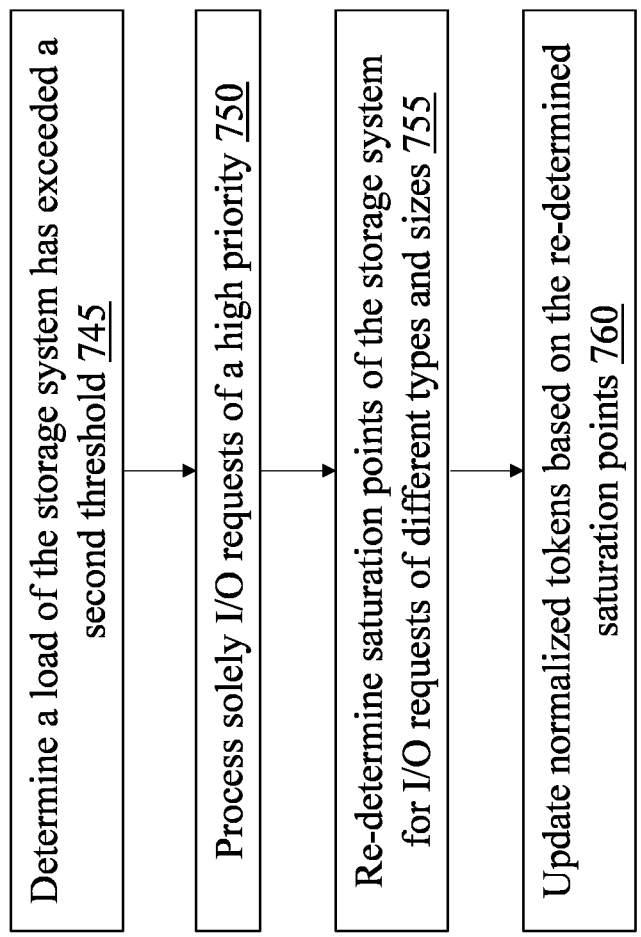

FIGS. 7A-7C are exemplary flow diagrams 700 of a method for maximizing performance of a storage system. The saturation points of a storage system are identified for I/O requests of different types and sizes (step 705), and normalized tokens are determined based on the saturation points (step 710). Unique numbers of normalized tokens are associated with I/O requests of different types and sizes (step 715). The number of normalized tokens for the queue depth limit of a storage device is determined (step 720).

Normalized tokens from the queue depth limit are allocated to each node in the storage system (step 725). I/O requests are processed according to the allocation of normalized tokens (step 730). A load of the storage system is determined to have exceeded a first threshold (step 735). I/O requests are processed according to a system of prioritization (step 740). A load of the storage system is determined to have exceeded a second threshold (step 745). Solely I/O requests of high priority are processed (step 750). Saturation points of the storage system for I/O requests of different types and sizes are re-determined (step 755), and normalized tokens are updated based on the re-determined saturation points (step 760).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for maximizing performance of a storage system, the method comprising:
   identifying saturation points of the storage system for I/O requests of different types and sizes, wherein the storage system models its performance for the I/O requests to identify the saturation points;
   determining, based on the saturation points, normalized tokens;
   associating unique numbers of normalized tokens with the I/O requests of different types and sizes;
   determining a number of normalized tokens for a queue depth limit of a storage device;
   allocating, by the storage system, from the queue depth limit, normalized tokens to each node in the storage device; and
   processing, by the storage system, I/O requests according to the allocations of normalized tokens.

2. The method of claim 1, wherein identifying the saturation points of the storage system for I/O requests of different types and sizes comprises:
   identifying the saturation points for each type of storage device in the storage system.

3. The method of claim 1, wherein allocating normalized tokens to each node in the storage device further comprises:
   allocating normalized tokens to each group of storage processors in each node.

4. The method of claim 1, further comprising:
   determining a load of the storage system has exceeded a first threshold; and
   processing I/O requests according to a system of prioritization.

5. The method of claim 4, wherein processing I/O requests according to the system of prioritization comprises:
   servicing high, medium, and low priority I/O requests according to a predetermined ratio.

6. The method of claim 5, wherein servicing high, medium, and low priority I/O requests according to the predetermined ratio comprises:
   servicing high, medium, and low priority I/O requests according to a predetermined ratio of requests or a predetermined ratio of available normalized tokens.

7. The method of claim 4, further comprising:
   determining a load of the storage system has exceeded a second threshold; and
   processing solely I/O requests associated with a high priority.

8. The method of claim 1, further comprising:
   updating normalized tokens based on newly identified saturation points of the storage system for I/O requests of different types and sizes.

9. The method of claim 1, wherein updating normalized tokens comprises:
   updating normalized tokens in response to (a) a determination regarding latency of the storage system, or (b) a predetermined schedule for storage system re-evaluation.

10. A system for maximizing performance of a storage system, the system including a processor configured to:
    identify saturation points of the storage system for I/O requests of different types and sizes, wherein the storage system models its performance for the I/O requests to identify the saturation points;
    determine, based on the saturation points, normalized tokens;
    associate unique numbers of normalized tokens with the I/O requests of different types and sizes;
    determine a number of normalized tokens for a queue depth limit of a storage device;
    allocate, by the storage system, from the queue depth limit, normalized tokens to each node in the storage device; and
    process, by the storage system, I/O requests according to the allocations of normalized tokens.

11. The system of claim 10, wherein the processor is further configured to:
    identify the saturation points for each type of storage device in the storage system.

12. The system of claim 10, wherein the processor is further configured to:
    allocate normalized tokens to each group of storage processors in each node.

13. The system of claim 10, wherein the processor is further configured to:
    determine a load of the storage system has exceeded a first threshold; and
    process I/O requests according to a system of prioritization.

14. The system of claim 13, wherein the processor is further configured to:
    service high, medium, and low priority I/O requests according to a predetermined ratio.

15. The system of claim 14, wherein the processor is further configured to:
    service high, medium, and low priority I/O requests according to a predetermined ratio of requests or a predetermined ratio of available normalized tokens.

16. The system of claim 13, wherein the processor is further configured to:
    determine a load of the storage system has exceeded a second threshold; and
    processing solely I/O requests associated with a high priority.

17. The system of claim 10, wherein the processor is further configured to:
    update normalized tokens based on newly identified saturation points of the storage system for I/O requests of different types and sizes.

18. The system of claim 10, wherein the processor is further configured to:
    update normalized tokens in response to (a) a determination regarding latency of the storage system, or (b) a predetermined schedule for storage system re-evaluation.

* * * * *